March 5, 1963     O. VON ZELEWSKY ETAL     3,079,821
SIGNALLING DEVICE FOR TOOL BREAKAGE ON METAL-CUTTING
MACHINE TOOLS, IN PARTICULAR ON LATHES
Filed Feb. 16, 1959     2 Sheets-Sheet 1

INVENTORS
OTTOMAR VON ZELEWSKY,
HANSJÖRG RENKER,
BY

John B. Brady
ATTORNEY

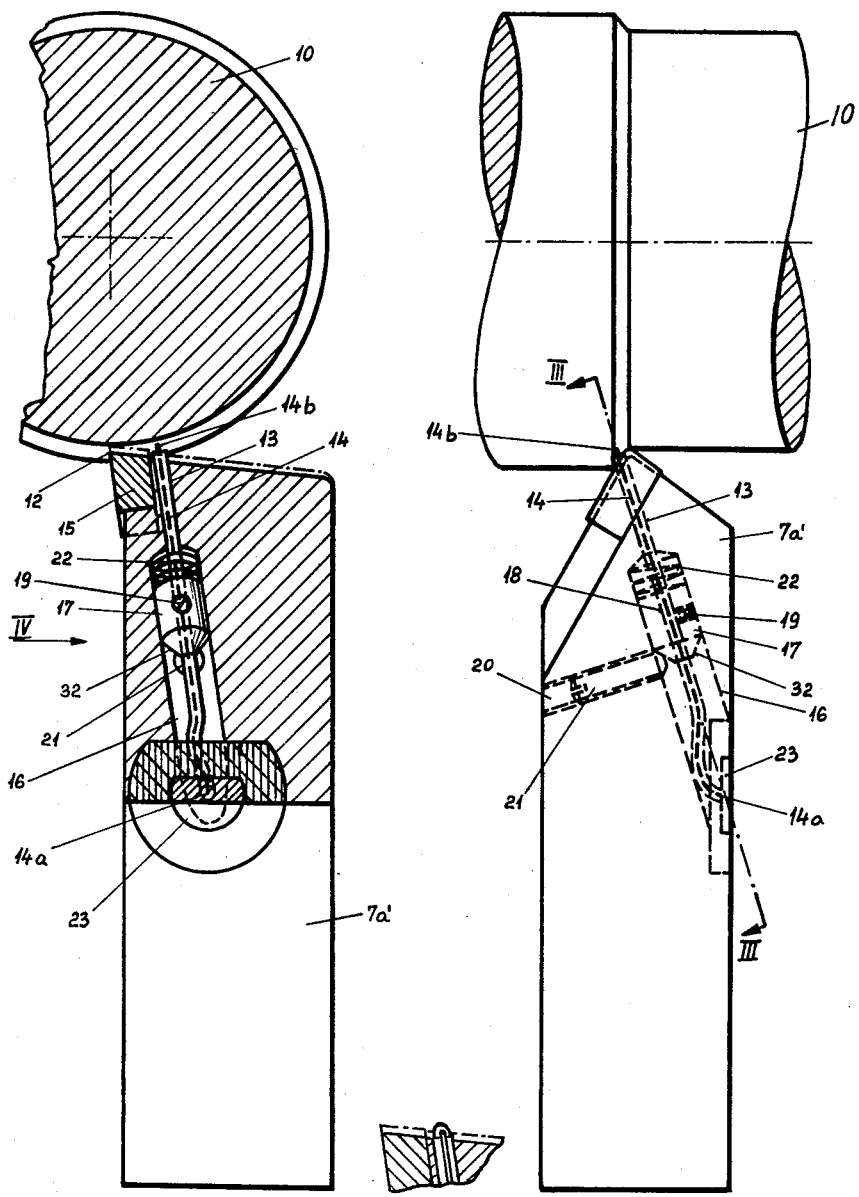

3,079,821
SIGNALLING DEVICE FOR TOOL BREAKAGE ON METAL-CUTTING MACHINE TOOLS, IN PARTICULAR ON LATHES
Ottomar von Zelewsky, Neuhausen am Rheonfall, and Hansjörg Renker, Schaffhausen, Switzerland, assignors to Georg Fischer Aktiengesellschaft, Schaffhausen, Switzerland, a Swiss company
Filed Feb. 16, 1959, Ser. No. 793,449
Claims priority, application Switzerland Mar. 20, 1958
3 Claims. (Cl. 82—1)

The present invention relates to a signalling device for tool breakage on metal-cutting machine tools, in particular on lathes.

In the operation of lathes, particularly when heavy chips are removed, much damage may result from defects in or failure of the cutting tip if the machine continues to operate under the predetermined working conditions. The tool shank being very sturdy in the majority of cases, it may cause great stresses in the work when frictionally engaging the work surface which is no longer being machined. This may result in damage or destruction of the centers, the clamping devices and the work.

In automatic and semi-automatic machine tools where visual checks are not made continuously, it is therefore very desirable to provide a device for the supervision of the condition of the tool cutting edge.

The present invention relates to such a device and is characterized by the fact that a feeler electrically insulated with respect to the tool shank is so arranged below the cutting edge of the tool that it will not touch the work surface machined by the intact cutting edge but contact a work surface produced by a damaged or destroyed cutting edge, and that this contact will close a circuit which affects the motion of the machine tool.

Two embodiments of the invention are represented in the drawing in which:

FIG. 3 is a longitudinal section along line III—III in FIG. 4 of a further embodiment, and FIG. 3A is a detail of the embodiment shown in FIGURES 3 and 4.

FIG. 4 is a view of the embodiment according to FIG. 3 in the direction of the arrow IV.

Figure 1:
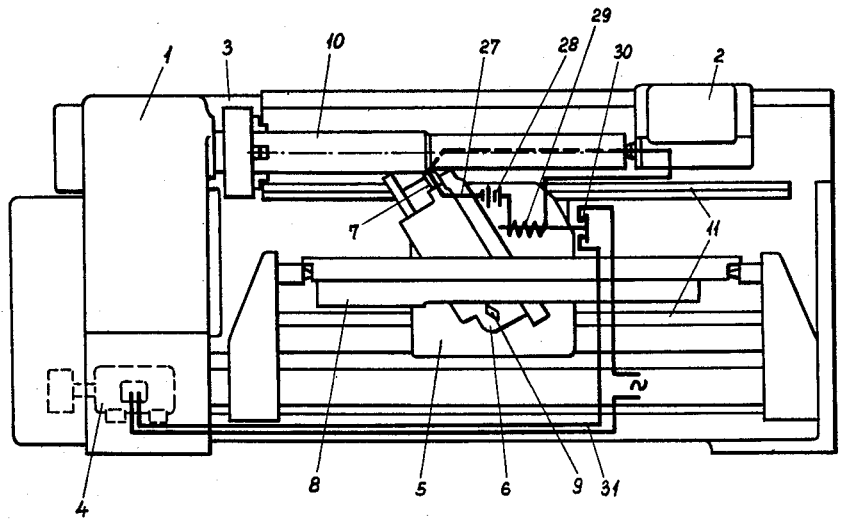
FIG. 1 is a diagrammatic view of a copying lathe with the circuit diagram of the signalling device according to this invention.
Figure 2:
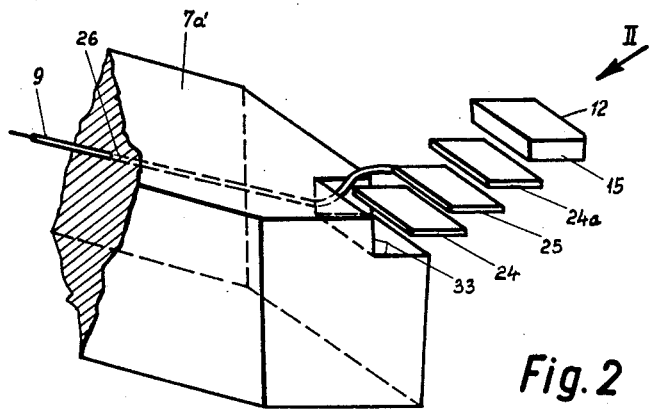
FIG. 2 is a diagrammatic view of a first embodiment.

In the example shown in FIG. 1 and FIG. 2 a copying lathe is equipped with a headstock 1 arranged on a base 3, a tailstock 2 and a work 10 driven and, respectively, supported by the headstock 1 and tailstock 2. Slidable on slide ways 11 provided on the base 3 is a carriage 5 which can be displaced in the direction of the axis of rotation of the work 10 by means of a feed motor 4. A copying saddle 6 arranged on the carriage 5 so as to be displaceable transversely to the axis of rotation of the work 10 by means of a copying device of any design, carries a turning tool 7 with a tool shank 7a and also carries a feeler 9, the latter being capable of engaging a former bar 8 when the carriage 5 is displaced.

The device according to this invention could, however, be arranged on other types of lathes as well.

According to the embodiment represented in FIGS. 3 and 4, a bore 13 in a tool shank 7a' opening below the tool tip 12 and incorporating an insulated lead 14 is provided to operate as a feeler. Soldered to the tool shank 7a' in the known manner is a cutting tip 15' formed e.g. of hard alloy, and a longitudinal bore 16, preferably arranged coaxially to bore 13, accommodates a sleeve 17 in the central bore 18 of which the insulated lead 14 can be clamped by means of a screw 19, the said sleeve 17 being longitudinally displaceable in the said bore 16. Arranged in a transverse bore 20 provided with a thread is a set screw 21 which engages a conical face 32 of the sleeve 17 and which is designed for fine longitudinal adjustment of the sleeve 17 biased by a compression spring 22 and of the insulated lead 14 and, respectively, its end 14b which projects from the tool shank 7a'. The feeler becomes operative when the tool tip 12 is destroyed owing to damage or breakage of the cutting tip 15' and the end 14b of the insulated lead 14 contacts the work surface 10 thereby making an electrical contact and closing the feeler circuit 28.

As FIGS. 3 and 4 reveal, for the purpose of connecting the rear end 14a of the insulated lead 14, an insulating contact plate 23 arranged in the tool shank 7a' may be employed to establish metallic contact between the lead end 14a and an opposite contact provided in a tool holder (not shown), insulated in respect of the machine and preferably designed as a resilient pin.

The cutting tip 15' shown in FIGS. 3 and 4 could, however, be held on the tool shank 7a' by means of a clamping device known in the art of suitable design.

The end 14b of the insulated lead 14 projecting from the bore 13 below the cutting edge 12 may be provided with a replaceable small cap 36, as shown in FIG. 3A, formed of an electrically insulating material which would be easily destroyed by abrasion, such as a suitable plastic. This will be particularly necessary if a coolant is employed in lathe operation.

In the embodiment of the invention according to FIG. 2, the electrical feeler consists of a metallic contact plate 25 arranged below the cutting tip 15 between two insulating plates 24 and 24A, and also insulated with respect to the shank 17. Attached to this contact plate 25 is the end of the insulated lead 14' accommodated in a bore 26 formed in the tool shank 7a. Clamping of members 24, 25, 24A and 15, arranged in the recess 33 provided therefor, in the direction of the arrow II is effected by a clamping device known in the art (not shown). The electrical feeler according to FIG. 2 becomes operative if the contact plate 25 engages the surface of the work 10 thus making electrical contact owing to breakage or damage to the cutting edge 12 of the tool tip 15 projecting beyond the said contact plate 25.

These two embodiments of the invention disclosed may, by way of example, be employed as control members for the discontinuation of certain processes determined by the operating cycle. FIG. 1 shows in full lines a circuit diagram of an arrangement in which the copying lathe is stopped upon response of the electrical feeler. The feeler circuit 27 comprises a voltage source 28 and a relay 29 which, upon response of the electrical feeler which may be designed according to FIG. 2 or FIGS. 3 and 4, opens the switch 30 of the motor circuit 31 thereby stopping the main motor 4.

The circuit may also be such as to discontinue the advancement of the carriage 5 on the machine bed 3 i.e. to stop the feed motor 4 by means of circuit 31 shown in FIG. 1 or to remove the copying saddle 6 holding the tool 7 from the work surface.

An optical or acoustic signalling device of suitable design could also be incorporated in the circuit 27 for the purpose of calling the operator's attention to the electrical feeler's response.

Having now particularly described and ascertained the nature of our said invention and in what manner the same is to be performed, we declare that what we claim is:

1. In a machine for operating on a conductive work-piece, a tool engageable with said work-piece, said tool and work-piece being relatively movable, said tool having a bore opening adjacent its point of engagement, a member within said bore inwardly of said opening and movable longitudinally of said bore, an electrical contact element insulated from said tool carried by said member and projecting through the opening of said bore in close proximity to said work-piece, and means to position said member in said bore including means biasing said member inwardly of said bore and means abutting said member to limit the movement thereof inwardly of the bore and adjustable to adjust the spacing between said element and said work-piece.

2. In a machine for operating on a conductive work-piece, a tool engageable with said work-piece for modifying the same, said tool and work-piece being relatively movable, an electrical contact element movably carried by said tool and insulated therefrom, and positioned in close proximity to said work-piece when said tool is in engagement with said work-piece, to contact said work-piece on failure of said tool, and a circuit including said conducting element and work-piece having electrically operated means actuated upon contact of said conductive element and said work-piece, a cover of insulating material positioned between said contact element and work-piece and destructible by moving engagement with said work-piece so as to allow contact of said contact element and work-piece to complete said circuit and stop said machine, means biasing said contact element away from the work-piece, and means carried by the tool forming adjustable abutment means engaging the contact element to hold the contact element in a predetermined position relative to the work-piece engaged by the tool.

3. In a machine for operating on a conductive work-piece, a tool engageable with said work-piece, said tool and work-piece being relatively movable, said tool having a bore opening adjacent its point of engagement, a member within said bore inwardly of said opening and movable longitudinally of said bore, an electrical contact element insulated from said tool carried by said member and projecting through the opening of said bore in close proximity to said work-piece, and means to position said member in said bore including a spring opposing movement of said member toward said opening and a screw accessible externally of said tool abutting said member and adjustable to move said member towards said opening.

References Cited in the file of this patent

UNITED STATES PATENTS

| | | |
|---|---|---|
| 527,988 | Hunter | Oct. 23, 1894 |
| 2,218,872 | Carris | Oct. 22, 1940 |
| 2,457,960 | Walker | Jan. 4, 1949 |
| 2,575,173 | Johnson | Nov. 13, 1951 |
| 2,627,392 | Morris | Feb. 3, 1953 |
| 2,716,368 | Thompson | Aug. 30, 1955 |
| 2,741,468 | Alspaugh | Apr. 10, 1956 |
| 2,835,757 | Chellemi et al. | May 20, 1958 |

FOREIGN PATENTS

| | | |
|---|---|---|
| 359,477 | Germany | Sept. 23, 1922 |